United States Patent [19]

Freeman

[11] Patent Number: 4,574,898

[45] Date of Patent: Mar. 11, 1986

[54] SCALE HAVING AN OVERLOAD PROTECTION MEANS FOR ATTACHING A PLATFORM TO A LOAD TRANSDUCER AND FOR PROTECTING AGAINST EXCESSIVE TORSION LOADS

[75] Inventor: Gerald C. Freeman, Darien, Conn.

[73] Assignee: Pitney Bowes Inc., Stamford, Conn.

[21] Appl. No.: 618,276

[22] Filed: Jun. 7, 1984

[51] Int. Cl.⁴ .................. G01G 23/02; G01G 21/10
[52] U.S. Cl. .................................. 177/154; 177/189
[58] Field of Search ................... 177/154, 189, 229

[56] References Cited

U.S. PATENT DOCUMENTS 3,973,637  8/1976  Kunz ................................ 177/189
4,420,054 12/1983  Caris .............................. 177/229 X

FOREIGN PATENT DOCUMENTS 0384227 12/1932  United Kingdom ............... 177/189
1356693  6/1974  United Kingdom .
2110392  6/1981  United Kingdom .

Primary Examiner—George H. Miller, Jr.
Attorney, Agent, or Firm—Robert H. Whisker; William D. Soltow, Jr.; Albert W. Scribner

[57] ABSTRACT

A scale having a base, a single point load cell and a platform is disclosed. The platform is fixed to the load cell at a single point by an overload protection structure which is substantially rigid under normal loads but which collapses under excessive torsion loads so that the platform may pivot and transfer the load to one or more downstops spaced around the periphery of the platform. A central downstop structure for protecting the load cell from excessive axial loads is also disclosed.

21 Claims, 4 Drawing Figures

SCALE HAVING AN OVERLOAD PROTECTION MEANS FOR ATTACHING A PLATFORM TO A LOAD TRANSDUCER AND FOR PROTECTING AGAINST EXCESSIVE TORSION LOADS

BACKGROUND OF THE INVENTION

FIG. 1 shows an exploded view of a load cell and base assembly taught in the commonly assigned, co-pending patent applications by the present inventor, entitled "Adjustable Inclined Plane Downstop For A Load Cell" and "Load Cell Assembly With Adjustable Stiffness". (A detailed description of the assembly shown is provided in the above mentioned applications, which are hereby incorporated by reference; however, those skilled in the art are believed able to make and use the subject invention without reference to such detailed description).

Load cell 10 functions as a transducer to convert applied load forces into proportionate electrical signals and is of the type known as "single-point" load cells. That is, all the load forces are applied to load cell 10 at point M. Typically, an extended platform is fixed more or less rigidly to single point M on load cell 10 in the design shown, as well as in other single-point load cell designs, so that bulky objects may be weighed.

Typically, scales with single-point load cell transducers protect the load cell from damage with a number of adjustable downstops. Usually there will be a centrally located downstop positioned under the moving end of the load cell or under the platform close to the load cell to prevent excessive deflection of the load cell under axial overloads. Movable element 20 serves this function in the design shown in FIG. 1. (By axial loads herein is meant loads normal to the plane of the platform which pass through the load point of the load cell and cause the load cell to deflect without twisting; in contrast to "torsion loads which tend to twist the load cell").

Such central downstops will protect the load cell from overloads placed in the center of the platform but are not effective against overloads applied away from the center and particularly along the periphery of the platform. Loads applied away from the platform center apply torsion loads to said load cell, and since excessive torsion loads may damage a load cell as easily as excessive axial loads, scales have typically protected load cells by arranging a plurality of downstops around the periphery of the platform. Downstops 40, shown in FIG. 1 are typical of such arrangements. Such peripheral overload protection is also shown in U.S. Pat. Nos. 4,278,139 and 4,420,054, both to Caris and both for "Weighing Apparatus With Overload Protection for Off-Center Loading", filed Aug. 3, 1979 and Oct. 23, 1981, respectively. In each of these patents downstops are positioned under the corners of a rectangular scale platform. Such downstops are disadvantageous in that each one requires a separate critical adjustment to close tolerances and in that they rely for effectiveness on a degree of flexibility in the platform and torsional flexibility in the load cell. Such flexibility is, however, incompatible with the high degree of rigidity required in these elements to achieve a high natural frequency, preferably greater than 30 Hz., and rapid response time.

Other references which teach various techniques for protecting a scale from overloads are: U.S. Pat. No. 4,058,179, to Price for "Load Cell Scale", filed June 16, 1976; which shows a scale with a platform mounted on a structure including a preloaded spring so that the platform would breakaway under overloads to protect the load cell, and U.S. Pat. No. 4,319,650, to Brendel, for "Load Cell Scale", filed Sep. 5, 1980; which shows a scale having a cantilevered platform which pivoted against preloaded springs under overload conditions so that the outboard edge of the platform was restrained by the base of the scale to prevent excessive deflection.

Thus, it is an object of the subject invention to provide a scale having a single point load cell transducer which is protected against torsion loads.

It is another object of the subject invention to provide such a scale wherein the difficulty of adjusting downstops to obtain such protection is substantially reduced or eliminated.

It is still another object of the subject invention to provide such a scale having a platform which is essentially rigidly mounted to the load cell transducer under normal load conditions.

SUMMARY OF THE INVENTION

The above objects are achieved and the disadvantages of the prior art are overcome in accordance with the subject invention by means of a scale which includes a base, a transducer for generating a signal proportional to an applied load fixed to the base, the transducer having a single point for the application of such a load, and a platform for receiving an object to be weighed. A plurality of downstops are fixed to the base and spaced around the periphery of the platform with the upper ends of the downstops being spaced from the underside of the platform. An overload protection structure connects the platform to the single load point of the transducer to transfer axial loads to the transducer while allowing the platform to pivot under excessive torsion loads so that such excessive loads are transferred to the peripheral downstops.

In a preferred embodiment the overload protection structure is substantially rigid in response to axial loads and torsion loads under a predetermined amount and sufficiently elastic in response to greater torsion loads to prevent substantial torsion load buildup before the torsion load is transferred to the peripheral downstops.

In a more preferred embodiment the overload protection structure includes a pair of axially aligned belleville washers, adjacent at their inside diameters, compressively loaded between the platform and the transducer means. ("Belleville washer" is a term recognized by those skilled in the art for frustoconical washers resilient under axial loads).

Such a scale provides a mechanically simple, inexpensive, easily assembled means for achieving the above objects. It is particularly advantageous that preferred embodiments may be designed to "collapse" (i.e., with substantially flat load/deflection curves) above a predetermined load so that exceptionally loose tolerances may be allowed on the spacing between the peripheral downstops and the platform.

Other objects and advantages will be readily apparent to those skilled in the art from consideration of the attached drawings and the detailed description set forth below.

DETAILED DESCRIPTION OF PREFERRED EMBODIMENTS OF THE SUBJECT INVENTION

Figure 2:
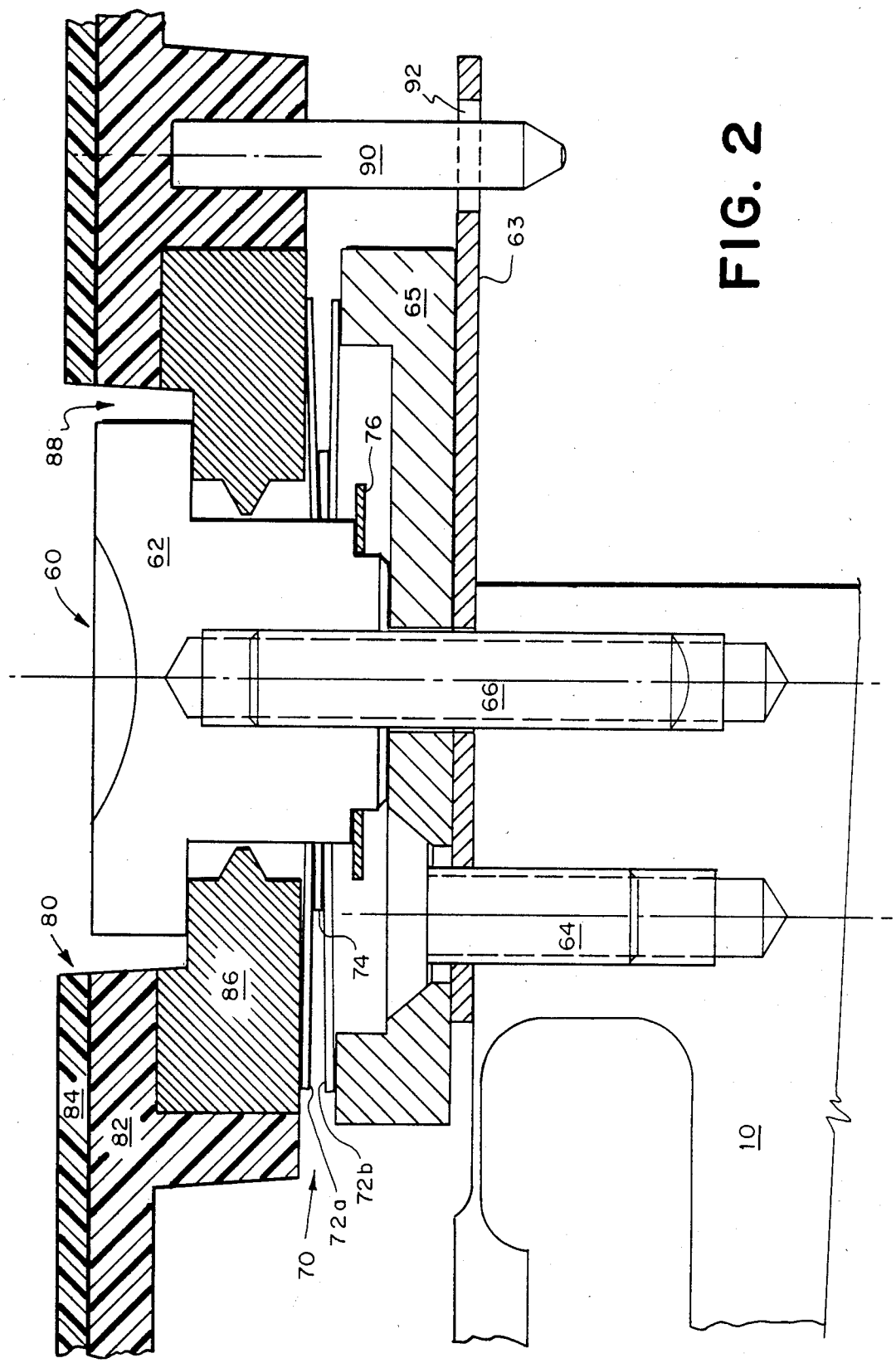
FIG. 2 a cross-sectional view of an overload protection structure for attaching a platform to the load cell in accordance with the subject invention.

FIG. 2 shows a cross-sectional detail of an overload protection means in accordance with the subject invention for connecting platform 80 to load cell 10 through a single point mounting while allowing platform 80 to pivot with respect to load cell 10 in response to excessive torsion loads such as might result from an overweight or dropped load on the edge of the platform. Platform 80, which includes structure 82, preferably formed from a lightweight, strong, plastic material; resilient protective surface 84; and metal insert 86, is fixed to load cell 10 by single point mounting 60 comprising shoulder screw 62, mounting plate 65, anti-rotation plate 63, mounting plate bolt 64 and stud 66. Pin 90 is fixed to structure 82 and passes through hole 92 in anti-rotation plate 63 to prevent rotation of platform 80 around stud 66. Stud 66 is fixed into load cell 10 and shoulder screw 62 screws onto it to secure platform 80 to load cell 10. Shoulder screw 62 is tightened until it touches mounting plate 65 compressing washer assembly 70 between mounting plate 65 and metal insert 86. Mounting plate 65 is fastened to and extends beyond load cell 10 to provide support completely around the periphery of washer assembly 70 while allowing stud 66 to be positioned so that axial loads are applied to load cell 10 at the proper point.

Washer assembly 70 includes belleville washers 72a and 72b separated by spacer 74 and coaxial with shoulder screw 62. Retaining ring 76 is fixed to shoulder screw 62 and serves to keep washer assembly 70 and shoulder screw 62 captive to platform 80 when shoulder screw is unfastened from stud 66.

Figure 1:
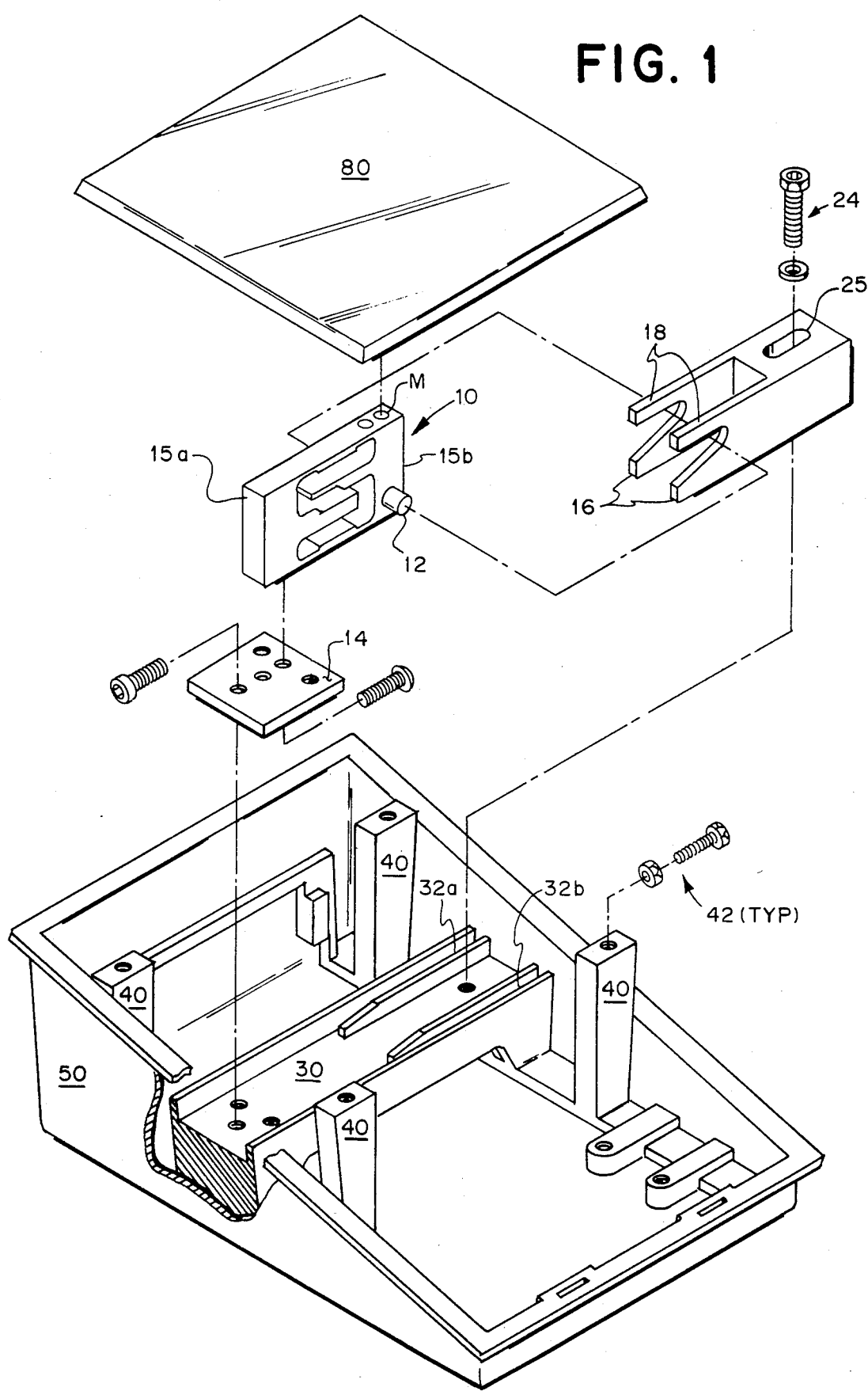
FIG. 1 shows an exploded view of a scale base and load cell.
Figure 3:
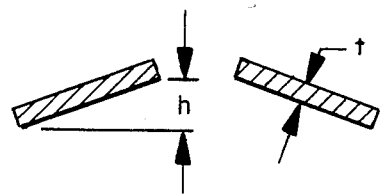
FIG. 3 shows a cross-sectional view of a belleville washer.
Figure 4:
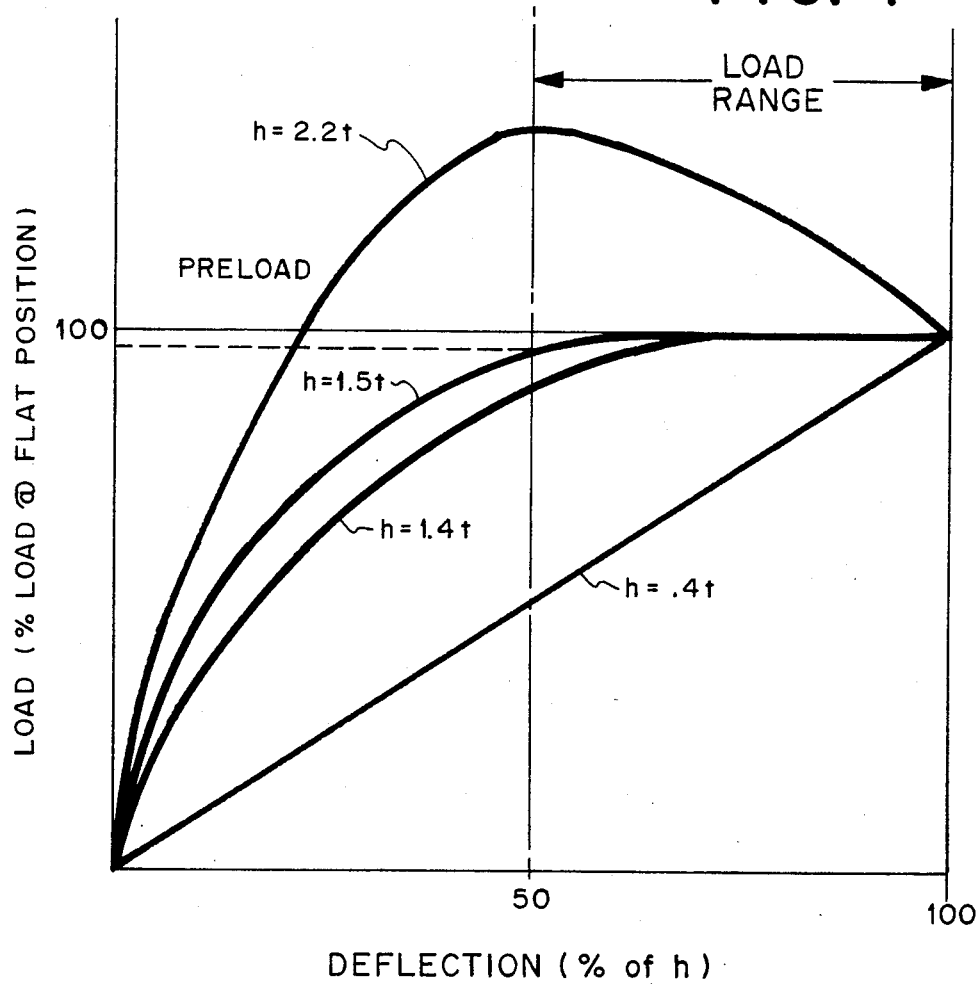
FIG. 4 shows normalized load/deflection characteristic curves for belleville washers having various height/thickness ratios.

When shoulder screw 66 is tightened down against mounting plate 65, belleville washers 72a and 72b are compressively loaded to approximately 50 percent deflection from their unloaded height. FIG. 4 shows that by selection of the height to thickness ratio (as measured in FIG. 3) of belleville washers 72a and 72b to be approximate 1.5, a substantially flat load/deflection curve over a load range from 50 to 100 percent deflection may be achieved. Thus, any load slightly greater than the preload on washer assembly 70 will cause belleville washers 72a and 72b to collapse to the flat state and allow platform 80 to pivot with respect to load cell in response to torsion forces so that such torsion forces are transferred to peripheral downstops 40 (shown in FIG. 1) and protecting load cell 10. (Note that gap 88 is provided around shoulder screw 62 to allow platform 80 to pivot freely). By proper choice of the diameter and/or materials for belleville washers 72a and 72b the preload can be appropriately chosen in relation to the design maximum load of the scale. Preferably belleville washers 72a and 72b should be chosen to collapse when a load of approximately 120 per cent of the rated full scale is placed on the periphery of platform 80. (Such design of belleville washers is well within the skill of those of ordinary skill in the art and need not be discussed further for an understanding of the subject invention).

It should be noted that the sharp "knee" in the load/deflection curve achieved by proper choice of the height/thickness ratio ensures rapid collapse onto the peripheral downstops without load build up on load cell 10 thus allowing loose tolerances on the spacing of the peripheral downstops from platform 80 and on the preload on washer assembly. Protecting the load cell from excessive torsion loads is no longer critical in adjusting downstops 40 and other factors, such as preventing pan 80 from hitting base 50, become limiting.

The embodiments described above and illustrated in the attached drawings have been given by way of illustration only and numerous other embodiments of the subject invention will be apparent to those skilled in the art from consideration of the above description and attached illustrations. Thus, limitations on the scope of the claimed invention are to be found only in the claims set forth below.

What is claimed is:

1. A scale comprising:
 (a) a base;
 (b) load transducer means fixed to said base for generating a signal proportional to an applied load, said transducer means having a single point for the application of such load;
 (c) a platform for receiving an object to be weighed;
 (d) downstop means fixed relative to said base and extending around the periphery of said platform, the upper portion of said downstop means being spaced from the underside of said platform;
 (e) overload protectin means for connecting said platform to said single point, for transferring axial loads to said transducer means through said single point, and for allowing said platform to pivot with respect to said transducer means about an axis in the plane of said platform in response to torsion loads greater than a predetermined torsion load, so that said torsion loads are transferred to said downstop means and said transducer means is protected from said torsion loads, said overload protection means being substantially rigid in response to axial loads and torsion loads less than said predetermined torision load, and sufficiently elastic in response to torsion loads greater than said predetermined load to prevent substantial torsion load build-up before said torision load is transferred to said downstop means and so that adjustment of said spacing between said upper portion of said downstop means and said platform is not critical.

2. A scale as described in claim 1 wherein said transducer means comprises a load cell.

3. A scale as described in claim 2 wherein the stiffness of said transducer means is chosen so that the natural frequency of said scale exceeds approximately 30 Hz.

4. A scale as described in claim 2 wherein said transducer means is protected from excessive axial loads by a central downstop.

5. A scale as described in claim 3 wherein the stiffness of said transducer means is chosen so that the natural frequency of said scale exceeds approximately 30 Hz.

6. A scale as described in claim 2 wherein said overload protection means further comprises a pair of axially aligned belleville washers, adjacent at their inside diameters, compressively loaded between said platform and said transducer means.

7. A scale as described in claim 6 wherein said belleville washers have a height to thickness ratio of approximately 1.5 and are preloaded to approximately 50 percent deflection so that the load/deflection characteristic of said belleville washers is substantially flat over the load range from about 50 to 100 per cent deflection of said belleville washers.

8. A scale as described in claim 7 wherein said preload is chosen so that a weight substantially greater than the maximum rated weight of said scale placed on the periphery of said platform will cause said belleville washers to collapse and said platform to pivot with respect to said transducer means, so that excessive torsion loads are transferred to said downstop means.

9. A scale as described in claim 1 wherein the stiffness of said transducer means is chosen so that the natural frequency of said scale exceeds approximately 30 Hz.

10. A scale as described in claim 9 wherein said overload protection means further comprises a pair of axially aligned belleville washers, adjacent at their inside diameters, compressively loaded between said platform and said transducer means.

11. A scale as described in claim 10 wherein said belleville washers have a height to thickness ratio of approximately 1.5 and are preloaded to approximately 50 percent deflection so that the load/deflection characteristic of said belleville washers is substantially flat over the load range from about 50 to 100 percent deflection of said belleville washers.

12. A scale as described in claim 11 wherein said preload is chosen so that a weight substantially greater than the maximum rated weight of said scale placed on the periphery of said platform will cause said belleville washers to collapse and said platform to pivot with respect to said transducer means, so that excessive torsion loads are transferred to said downstop means.

13. A scale as described in claim 1 wherein said overload protection means further comprises a pair of axially aligned belleville washers, adjacent at their inside diameters, compressively loaded between said platform and said transducer means.

14. A scale as described in claim 13 wherein said belleville washers have a height to thickness ratio of approximately 1.5 and are preloaded to approximately 50 percent deflection so that the load/deflection characteristic of said belleville washers is substantially flat over the load range from about 50 to 100 percent deflection of said belleville, washers.

15. A scale as described in claim 14 wherein said preload is chosen so that a weight substantially greater than the maximum rated weight of said scale placed on the periphery of said platform will cause said belleville washers to collapse and said platform to pivot with respect to said transducer means, so that excessive torsion loads are transferred to said downstop means.

16. A scale as described in claim 13 wherein said compressive load on said belleville washers establishes said predetermined torsion load.

17. A scale as described in claim 16 wherein said belleville washers have a height to thickness ratio of approximately 1.5 and are preloaded to approximately 50 percent deflection so that the load/deflection characteristic of said belleville washers is substantially flat over the load range from about 50 to 100 percent deflection of said belleville washers.

18. A scale as described in claim 17 wherein said preload is chosen so that a weight substantially greater than the maximum rated weight of said scale placed on the periphery of said platform will cause said belleville washers to collapse and said platform to pivot with respect to said transducer means, so that excessive torsion loads are transferred to said downstop means.

19. A scale as described in claim 25 wherein said overload protection means further comprises a pair of axially aligned belleville washers, adjacent at their inside diameters, compressively loaded between said platform and said transducer means.

20. A scale as described in claim 19 wherein said belleville washers have a height to thickness ratio of approximately 1.5 and are preloaded to approximately 50 percent deflection so that the load/deflection characteristic of said belleville washers is substantially flat over the load range from about 50 to 100 per cent deflection of said belleville washers.

21. A scale as described in claim 20 wherein said preload is chosen so that a weight substantially greater than the maximum rated weight of said scale placed on the periphery of said platform will cause said belleville washers to collapse and said platform to pivot with respect to said transducer means, so that excessive torsion loads are transferred to said downstop means.

* * * * *

UNITED STATES PATENT AND TRADEMARK OFFICE
CERTIFICATE OF CORRECTION

PATENT NO. : 4,574,898
DATED : March 11, 1986
INVENTOR(S) : Gerald C. Freeman

It is certified that error appears in the above—identified patent and that said Letters Patent is hereby corrected as shown below:

Claim 19, line 1 "25" should be --1--.

Claim 5, line 1 "3" should be --4--.

Signed and Sealed this

Tenth Day of November, 1987

*Attest:*

DONALD J. QUIGG

*Attesting Officer*   *Commissioner of Patents and Trademarks*